United States Patent [19]

Hirtsiefer

[11] 4,003,274
[45] Jan. 18, 1977

[54] SUN AND PLANET GEAR TRANSMISSION MECHANISM PARTICULARLY FOR POWER WRENCHES

[76] Inventor: Karl-Richard Hirtsiefer, 5206 Neunkirchen-Kobach, Germany

[22] Filed: Apr. 24, 1974

[21] Appl. No.: 463,485

[30] Foreign Application Priority Data

Apr. 25, 1973  Germany .................. 2320757

[52] U.S. Cl. .................................. 74/768
[51] Int. Cl.² ................................ F16H 57/10
[58] Field of Search ........... 74/768, 769, 802, 797, 74/369, 355

[56] References Cited

UNITED STATES PATENTS

| 824,085 | 6/1906 | Thomas .................. 74/355 |
| 1,101,473 | 6/1914 | Schwinnen ............... 74/355 |
| 2,152,517 | 3/1939 | Whitney et al. ........ 74/802 X |
| 3,135,135 | 6/1964 | Dalton .................. 74/802 X |
| 3,364,769 | 1/1968 | Etherton, Sr. ........... 74/355 |
| 3,598,188 | 8/1971 | Foster .................. 74/768 |

FOREIGN PATENTS OR APPLICATIONS

| 1,275,017 | 9/1960 | France ................. 74/768 |
| 1,159,718 | 12/1963 | Germany ............... 74/768 |
| 416,331 | 9/1934 | United Kingdom ........ 74/768 |

*Primary Examiner*—Samuel Scott
*Assistant Examiner*—Frank H. McKenzie, Jr.
*Attorney, Agent, or Firm*—Neil F. Markva

[57] ABSTRACT

The sun and planet gear transmission mechanism comprises a power input shaft and at least two successive gear steps including a first gear step and a second gear step disposed within a gear casing. Each gear step includes a sun gear and at least one planet gear. The sun gear of the first gear step is connected to the power input shaft. The power input shaft is axially displaceable so that the sun gear may be disengaged with the appertaining planet gear in the first gear step. Coupling means located at an adjacent gear step is effective to engage the sun gear of the first gear step when said sun gear is disengaged from said planet gear in the first gear step.

13 Claims, 2 Drawing Figures

SUN AND PLANET GEAR TRANSMISSION MECHANISM PARTICULARLY FOR POWER WRENCHES

BACKGROUND OF THE INVENTION

The invention relates to a changeable sun and planet gear mechanism. More particularly, a sun and planet gear transmission mechanism is used for power wrenches and comprises a power input shaft and at least two successive gear steps of a sun gear and at least one planet gear.

The use of several successively arranged gear steps and a sun and planet gear arrangement is well known for obtaining large transmission ratios. In such arrangements, the driven power input shaft has a sun gear disposed at the end thereof in the first gear step. The planet gears are supported by a planet gear carrier and are rotatively mounted in the gear casing. The gear casing has an internal toothing disposed along its entire periphery on the inside surface thereof. The input torque is transmitted from the power driven input shaft to the planet gears and the planet gear carrier via the sun gear located in the first gear step. Upon transmission of the input torque, the planet gears rotate in the gear casing and effect a roll motion at the internal toothing of the gear casing.

The planet gear carrier of the first gear step is connected anti-rotationally with the sun gear of the second gear step or it is formed in accordance therewith. The planet gears of the second gear step rotate around the sun gear of the second gear step. Depending upon the desired transmission ratio, any number of further gear steps may be located within the sun and planet gear mechanism. It is known to dimension the individual gear steps in such a way that a through internal toothing can be provided in longitudinal direction at the gear casing. The planet gears of all the gear steps engage this internal toothing.

It is also known to use multi-stage sun and planet gears for power wrenches in which the torque to applied manually and transmitted with amplification to a screw head coupled with the power output shaft. To accomplish this, it is necessary to deviate the reaction force of the gear case to prevent the gear case from rotating with the shaft. Therefore, it is known to fit a bow at the gearbox finding its support near the screw at a fixed point.

The transmission ratio may be changed for prior art gear wrenches. Claws are provided at the coupling portion that are connected with the power input shaft. These claws engage counter-claw of the gear case if the power input shaft is inserted in longitudinal direction into the gear case. When the arrest is effected this way, the gear is blocked and the screw can be turned only if the total case co-rotates without the mutual relative movements of its members. Therefore, it is possible to change between the normal transmission ratio and a transmission of 1:1.

PURPOSE OF THE INVENTION

The primary object of this invention is to provide a sun and planet gear mechanism of the type discussed hereinabove which may be changed between different transmission ratios by disconnection of at least one gear step.

SUMMARY OF THE INVENTION

This objective and other advantages are accomplished by the sun and planet gear transmission mechanism as described herein. The sun gear of the first gear step in the gear mechanism is connected with the input shaft and is axially displaceable along the longitudinal axis of the sun and planet gear mechanism. The sun gear may be engaged and disengaged with the appertaining planet gears in the first gear step. When it is disengaged from the planet gears in the first gear step, the input shaft engages at the sun gear of a gear step connected subsequently or adjacent the first gear step.

Under normal circumstances, the planet gears of the first gear step are driven via the appertaining sun gear so that all of the gear steps are in operation. A coupling element is provided at the sun gear in the first gear step and may consist either of the sun gear toothing itself or an additional toothing section. When the change-over is made, the coupling element engages the internal toothing of the sun gear of a subsequently connected gear step. Consequently, the sun gear of the first gear step is connected anti-rotationally with the power input shaft thus omitting at least the first gear step. The planet gears of the first gear step rotate without transmitting power.

Another feature of the invention is directed to a mechanism for arresting the power input shaft at precise switch positions and for avoiding the displacement to an intermediate position. At such an intermediate position, the gear mechanism would be blocked. At least two annular grooves are laterally spaced with respect to each other and axially along the displaceable power input shaft. A stop device is provided at the gear casing to engage the annular grooves when the input shaft is at the desired switch position.

A further feature of the invention provides a reverse stop which engages a toothing extending longitudinally along the power input shaft. The reverse stop may be housed in the portion of the gear casing enclosing the power input shaft. One of the annular grooves is located within the area of the toothed portion thereby interrupting it. The reverse stop permits a change-over so that it can be used for both the senses of rotation.

BRIEF DESCRIPTION OF DRAWINGS

Other objects of this invention will appear in the following description and appended claims, reference being made to the accompanying drawing forming a part of the specification.

DESCRIPTION OF SPECIFIC EMBODIMENTS

Figure 1:
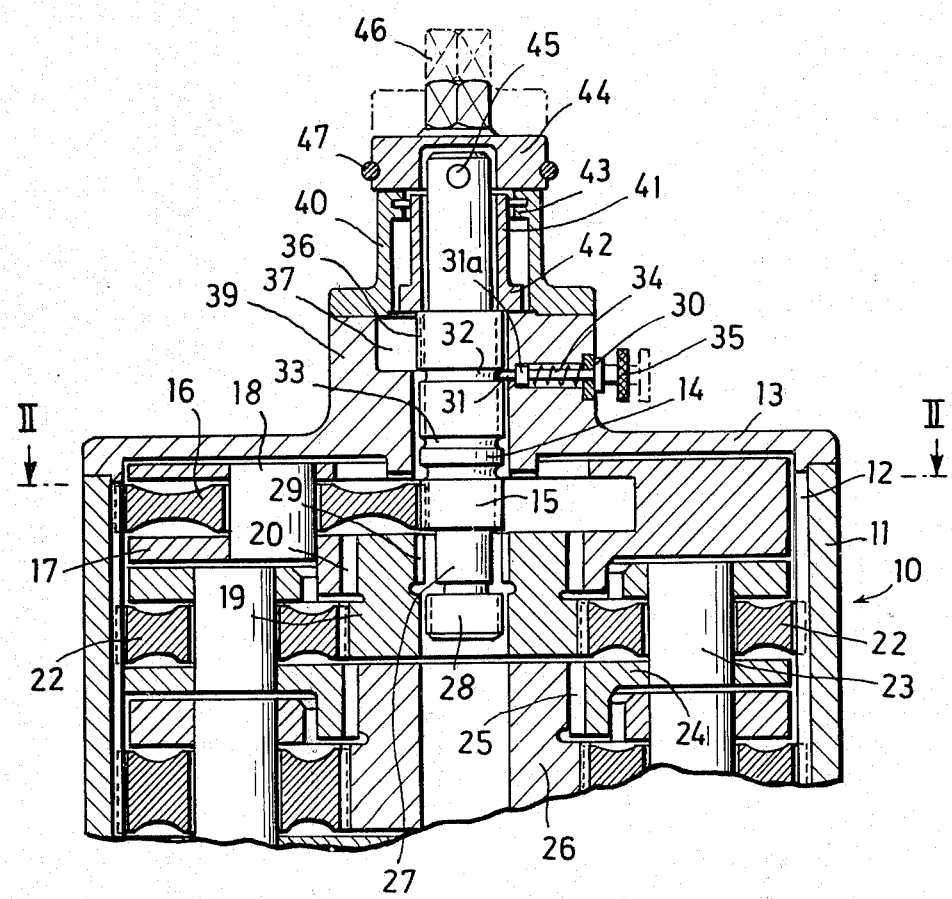
FIG. 1 is a fragmentary longitudinal cross-sectional view of a sun and planet gear mechanism made in accordance with this invention.
Figure 2:
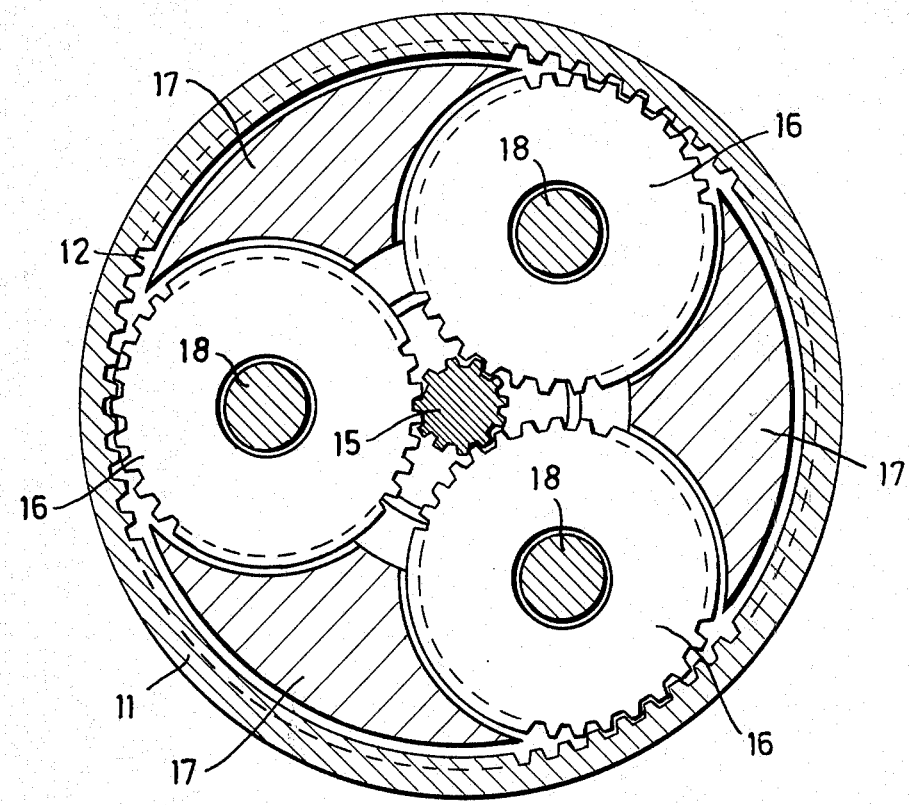
FIG. 2 is a sectional view taken along line II—II of FIG. 1.

The gear housing, generally designated 10, includes a cylindrical element 11 having longitudinally extending through internal toothing 12 disposed around its entire inner surface. Front plate 13 closes the gear casing 10 along its front face and is connected thereto by screws (not shown). The input shaft 14 passes through the front plate 13 into the inside of the gear case 10.

Sun gear 15 of the first gear step is located on the input shaft 14 and meshes with several planet gears 16. Only one of the planet gears 16 is visible in the drawing of FIG. 1. Planet gears 16 are held by a co-rotating planet gear carrier 17 on the bearing bolts 18 on which they are supported pivotally. Additionally, planet gears 16 mesh with the internal toothing 12 of the gear case 10.

The sun gear 15 of the first gear step may have several toothings interrupted by an interspace. One toothing may mesh with the planet gears 16 of the first gear step or another toothing may engage the internal toothing of the sun gear of a subsequently arranged gear step. The meshing engagements are alternative.

The term "toothing" must be understood in its broadest sense. It is important that the power input shaft or the sun gear respectively of the first gear step is coupled anti-rotationally with the sun gear of the second gear step. This is, for instance, also possible where the end of the power drive shaft is formed as a wedge shaft. The wedge of the wedge shaft engages a corresponding counter-wedge of the sun gear of the second gear step.

The planet gear carrier 17 of the first gear step is secured against rotation with the sun gear 19 of the second gear step. Planet gear carrier 17 and sun gear 19 intermesh with a toothing or wedge 20.

Planet gears 22 of the second gear step rotate about sun gear 19. Planet gears 22 are supported pivotally on bearing bolts 23 of a further planet gear carrier 24 and mesh with the internal teeth 12 of the gear case element 11. Planet gear carrier 24 is connected with the sun gear 26 of a third gear step by a toothing or wedge 25. It is not deemed necessary to explain details of the third gear step because the first gear step is the only one having any importance with respect to the present invention.

Power input shaft 14 includes an extension portion 27 having a toothing or wedging 28 located at the end thereof. Wedging 28 engages in an internal toothing or internal wedging 29 of the sun gear 19 when the power drive shaft 14 is in an extracted position. When the power drive shaft 14 is in the inserted position, the toothings 28 and 29 are out of engagement. However, the sun gear 15 meshes with the planet gears 16. In this case, a very large transmission ratio is obtained.

The power drive shaft 14 may be removed to its outermost operating position so that the gear teeth 15 and 16 are out of engagement. However, in this outermost position, the toothings 28 and 29 are mutually engaged. Consequently, the power input shaft 14 directly drives the sun gear 19 of the second gear step. That is, shaft 14 is connected anti-rotationally with sun gear 19 so that the first gear step is disconnected and the planet gears of 16 are rotating idly. In this case, the transmission ratio is smaller than in the first switch position.

Safety lock 30 is used to protect against any accidental switching and avoids intermediate switch positions of the power input shaft 14 in which the gear would be blocked. Safety lock 30 includes a spring-loaded pin 31 which is radially directed to the power drive shaft 14. Pin 31 may engage either one of the two annular grooves 32 and 33 which are laterally displaced with respect to each other along the shaft 14. When pin 31 protrudes into the annular groove 32, sun gear 15 meshes with the planet gear 16. When pin 31 engages the annular groove 33, the toothing 28 mesh with the toothing 29 of the sun gear 19. The number of annular grooves always corresponds to the number of switch steps.

Stop 31a prevents pin 31 from being pressed against the bottom of either of the annular grooves 32 and 33 by the spring 34. Therefore, the stop 31a prevents any additional friction between the pin 31 and the shaft 14. The knurled knob 35 located at the outer end of pin 31 is used to withdraw pin 31 from either of the grooves 32 and 33. Thus, the power input shaft 14 is freely displaceable and may be axially adjusted as desired.

Annular groove 32 is located in the central area of a longitudinal toothed portion 36 along the power input shaft 14. A reverse stop 37 engages the toothed portion 36 in a known manner. The sense of rotation of stop 37 is reversible and causes input shaft 14 not to run backwardly due to the torsion tension generated in the equipment. Toothing 36 has a length sufficient to engage the reverse stop 37 in each of the two switch positions.

The safety lock 30 and reverse stop 37 are disposed in a front-side shoulder 39 of the closure plate 13. A sleeve-like cap 40 is connected to the shoulder 39 by screws (not shown). Sleeve member 41 positioned within the cap 40 enclosed the power input shaft 14. The lower end of sleeve 41 has an external flange 42. Sleeve 41 is axially displaceable together with the power input shaft 14. Movement of sleeve 41 is limited by the external flange 42 which pushes against the front side internal flange 43 of the cap 40. Movement is limited in the other direction when the flange 42 abuts against the shoulder 39 as illustrated in continuous lines in the drawing.

The adjustments of the transmission ratio are effected suitably at a switch head 44 that is firmly connected with the power input shaft 14. The switch head 44 is located outside the gear casing 10 and has suitable means for manipulation. For example, an edge profile or structure is present to allow its manual adjustment. At the same time, the switch head 44 may include the connecting device 46 for the rotation drives. That is, the connecting device may be in the form of a square end.

The switch head 44 is fixed on the power input shaft above sleeve 41 by means of a shear pin 45. Switch head 44 carrier a square end 46 or the like at which may be applied a lathe tool. Switch head 44 includes a rotating handle ring 47 projecting slightly laterally and facilitating the extraction and insertion of power input shaft 14. Handle ring 47 passes over the bore in which the shear pin 45 is positioned. Thus ring 47 prevents the ejection of parts of shear pin 45 in the event of pin breakage. Consequently, the risk of accident is accordingly reduced.

ADVANTAGES OF THE INVENTION

Due to the structural configuration of the sun and planet gear transmission mechanism of the present invention, the transmission ratio of the sun and planet gear may be changed by a simple axial displacement of the power input shaft. This is particularly convenient with power wrenches. That is, the user can adjust the transmission ratio at the input side of the gear. It is necessary only for the user to push the power input shaft either slightly forward or backward with respect to the gear casing for the desired rotation to be effected.

When the coupling means at the sun gear of the second gear step is designed as an internal toothing which is adapted to the toothing of the sun gear of the first gear step, no additional coupling means need be provided at the power input shaft.

While the sun and planet gear transmission mechanism particularly for power wrenches has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A sun and planet gear transmission mechanism particularly for power wrenches comprising:
   a. a power input shaft and at least two successive gear steps including a first gear step and a second gear step disposed within a gear casing,
   b. each said first and second gear steps including a sun gear and at least one planet gear,
   c. the sun gear of the first gear step being connected to the power input shaft and the sun gear of the second gear steps being in a fixed location within said gear casing,
   d. said power input shaft being axially displaceable and said sun gear of the first gear step is disengagable with respect to the appertaining planet gear in said first gear step, and
   e. coupling means located at said second gear step is effective to engage the sun gear of said second gear step when said sun gear of the first gear step is disengaged from said planet gear in the first gear step.

2. A gear mechanism as defined in claim 1 wherein said power input shaft includes a plurality of annular grooves laterally displaced with respect to each other along the axial length of the power input shaft,
said gear casing includes a stop device for engaging at least one of the annular grooves to arrest the axially displaceable power input shaft at a desired switch position within the casing.

3. A gear mechanism as defined in claim 2 wherein a reverse stop means is disposed in said gear casing for engaging a toothing disposed along the power input shaft,
one of said annular grooves being located on the input shaft within said toothing to form separated portions therein.

4. A gear mechanism as defined in claim 2 wherein said stop device comprises a safety lock having a pin projecting resiliently into an annular groove and a handle for retracting said pin from said annular groove.

5. A gear mechanism as defined in claim 1 wherein said input shaft includes a switch head means fixedly disposed at the outer end thereof outside said gear casing,
said switch head includes a connecting means for attaching a driving mechanism.

6. A gear mechanism as defined in claim 1 wherein said power input shaft includes an inner extension section located adjacent the sun gear of the first gear step,
said coupling means for engaging the sun gear of a subsequently connected gear step includes cooperating portions on said extension section and the sun gear of said subsequently connected gear step.

7. A gear mechanism as defined in claim 6 wherein said cooperating portions include a first toothing on said extension and a second toothing on the sun gear of the subsequently connected gear step.

8. A gear mechanism as defined in claim 1 wherein the sun gear of the first gear step has several toothings interrupted by an interspace,
the sun gear in said subsequently connected gear step has an internal toothing
said internal toothing having a structural configuration that is effective to engage a further toothing of the sun gear of the first step,
the sun gear of said first gear step being in driving engagement with the apertaining planet gear in said first gear step.

9. A gear mechanism as defined in claim 1 wherein a movement limiting means is located at the outer end of the power input shaft for limiting the movement of the power input shaft.

10. A gear mechanism as defined in claim 9 wherein said limiting means includes two intermeshing sleeves having flanges constituting abutment means providing a limited distance of movement of the input shaft inwardly and outwardly from the gear casing.

11. A power wrench sun and planet gear mechanism comprising:
   a. a power input shaft and at least two successive gear steps including a first gear step and a second gear step disposed within a gear casing,
   b. each said first and second gear steps including a sun gear and at least one planet gear,
   c. the sun gear of the first gear step being connected to the power input shaft and the sun gear of the second gear step being in a fixed location within said gear casing,
   d. said power input shaft being axially displaceable and said sun gear of the first gear step is disengagable with respect to the appertaining planet gear in said first gear step, and
   e. coupling means located at an adjacent gear step and being effective to engage the sun gear of said adjacent gear step when said sun gear of the first gear step is disengaged from said planet gear in the first gear step.

12. A sun and planet gear transmission mechanism particularly for power wrenches, comprising:
   a. a power input shaft and at least two successive gear steps including a first gear step and a second gear step disposed within a gear casing,
   b. said first gear step including at least one planet gear and said second gear step including a sun gear and at least one planet gear,
   c. said power input shaft carrying a sun gear at a first location along its longitudinal axis and a coupling member at a second location laterally displaced from said first location,
   d. said power input shaft being axially displaceable between a first switch position and a second switch position,
   e. said sun gear carried by the input shaft being engaged with the planet gear of the first gear step when the shaft is in said first switch position and the coupling member is disengaged, and
   f. said coupling member being engaged with the sun gear of the second gear step when the shaft is in said second switch position and the input shaft sun gear is disengaged.

13. A gear mechanism as defined in claim 12 wherein the sun gear in the second gear step has an inner toothing engageable with the coupling member in fixed relationship with respect to the input shaft.

* * * * *

UNITED STATES PATENT OFFICE
CERTIFICATE OF CORRECTION

Patent No. 4,003,274            Dated January 18, 1977

Inventor(s) Karl-Richard Hirtsiefer

It is certified that error appears in the above-identified patent and that said Letters Patent are hereby corrected as shown below:

On the cover sheet Item (73) should appear:

-- Paul-Heinz Wagner Maschinenfabrikation, Much-Birrenbachshohe, Germany --.

Signed and Sealed this

Seventeenth Day of May 1977

[SEAL]

*Attest:*

RUTH C. MASON            C. MARSHALL DANN
*Attesting Officer*            *Commissioner of Patents and Trademarks*